United States Patent [19]

Goldberg

[11] Patent Number: 5,767,785
[45] Date of Patent: Jun. 16, 1998

[54] METHOD AND APPARATUS FOR SELECTING A BATCH OF PENDING MESSAGES FOR A NEXT TRANSMISSION

[75] Inventor: Steven Jeffrey Goldberg, Fort Worth, Tex.

[73] Assignee: Motorola, Inc., Schaumburg, Ill.

[21] Appl. No.: 641,596

[22] Filed: May 1, 1996

[51] Int. Cl.$^6$ .................................................. H04Q 7/18
[52] U.S. Cl. .................. 340/825.44; 340/311.1; 455/186.1; 455/67.3; 455/226.2; 370/313; 395/3; 395/20; 395/61
[58] Field of Search .................. 340/825.44, 825.47, 340/311.1, 825.69; 455/186.1, 31.1, 426, 67.3, 69, 440, 441, 67.1, 226.2, 452, 512; 370/313; 395/10, 3, 12, 20, 61

[56] References Cited

U.S. PATENT DOCUMENTS

| | | | |
|---|---|---|---|
| 5,072,444 | 12/1991 | Breeden et al. | 340/825.44 X |
| 5,432,842 | 7/1995 | Kinoshita et al. | 455/440 |
| 5,444,820 | 8/1995 | Tzes et al. | |
| 5,546,411 | 8/1996 | Leitch et al. | 455/67.3 X |
| 5,606,729 | 2/1997 | D'Amico et al. | 455/67.1 |
| 5,644,627 | 7/1997 | Segal et al. | 340/825.44 X |

*Primary Examiner*—Michael Horabik
*Assistant Examiner*—William H. Wilson, Jr.
*Attorney, Agent, or Firm*—R. Louis Breeden

[57] ABSTRACT

A radio frequency manager (12) for choosing a selective call protocol among a plurality of selective call protocols comprises a memory (13) for storing historical data on messages previously sent, the historical data comprising for each protocol an airtime efficiency rating, a latency measurement, and a message queue profile and another memory (15) for storing pending messages, each of the pending messages having current information comprising at least an associated priority, synchronization requirement, and an allowable transmission time for sending the pending messages. The radio frequency manager further comprises a sorter (11) for classifying the historical data and the current information using fuzzy logic, wherein the sorter comprises a fuzzifier (14) for generating membership values, a rule base (16) for applying a set of predetermined rules to the current input conditions to perform a mapping with the historical conditions, and a defuzzifier (18) for generating a non-fuzzy prediction recommendation from the mapping for generating the optimum protocol.

18 Claims, 10 Drawing Sheets

IF flex_sync_required IS scheduled THEN flex_xmit_need IS high;
IF flex_sync_required IS missed_more_than_one THEN flex_xmit_need IS must_be_sent;

(flex_pending_weight) IF flex_pending IS few THEN flex_xmit_need IS little;
(flex_pending_weight) IF flex_pending IS half & flex_pending_trend IS NOT falling_behind THEN flex_xmit_need IS some;
(flex_pending_weight) IF flex_pending IS half & flex_pending_trend IS falling_behind THEN flex_xmit_need IS high;
(flex_pending_weight) IF flex_pending IS many THEN flex_xmit_need IS high;
(flex_pending_weight) IF flex_pending IS overflow_eminent THEN flex_xmit_need IS must_be_sent;

tradeoffs between latency and efficiency are being made
(flex_latency_weight) IF flex_latency IS low THEN flex_xmit_need IS little;
(flex_latency_weight) IF flex_latency IS some AND flex_efficiency IS low THEN flex_xmit_need IS little;
(flex_latency_weight) IF flex_latency IS some AND flex_efficiency IS high THEN flex_xmit_need IS some;
(flex_latency_weight) IF flex_latency IS high AND flex_efficiency IS low THEN flex_xmit_need IS some;
(flex_latency_weight) IF flex_latency IS high AND flex_efficiency IS high THEN flex_xmit_need IS high;
(flex_latency_weight) IF flex_latency IS excessive THEN flex_xmit_need IS must_be_sent;

(flex_priority_weight) IF flex_priority IS low THEN flex_xmit_need IS little;
(flex_priority_weight) IF flex_priority IS medium THEN flex_xmit_need IS some;
(flex_priority_weight) IF flex_priority IS next_opportunity THEN flex_xmit_need IS high;
(flex_priority_weight) IF flex_priority IS preemptive THEN flex_xmit_need IS must_be_sent;

(pocsag_pending_weight) IF pocsag_pending IS few THEN pocsag_xmit_need IS little;
(pocsag_pending_weight) IF pocsag_pending IS half & pocsag_pending_trend IS NOT falling_behind THEN pocsag_xmit_need IS some;
(pocsag_pending_weight) IF pocsag_pending IS half & pocsag_pending_trend IS falling_behind THEN pocsag_xmit_need IS high;
(pocsag_pending_weight) IF pocsag_pending IS many THEN pocsag_xmit_need IS high;
(pocsag_pending_weight) IF pocsag_pending IS overflow_eminent THEN pocsag_xmit_need IS must_be_sent;

tradeoffs between latency and efficiency are being made
(pocsag_latency_weight) IF pocsag_latency IS low THEN pocsag_xmit_need IS little;
(pocsag_latency_weight) IF pocsag_latency IS some AND pocsag_efficiency IS low THEN pocsag_xmit_need IS little;
(pocsag_latency_weight) IF pocsag_latency IS some AND pocsag_efficiency IS high THEN pocsag_xmit_need IS some;
(pocsag_latency_weight) IF pocsag_latency IS high AND pocsag_efficiency IS low THEN pocsag_xmit_need IS some;
(pocsag_latency_weight) IF pocsag_latency IS high AND pocsag_efficiency IS high THEN pocsag_xmit_need IS high;
(pocsag_latency_weight) IF pocsag_latency IS excessive THEN pocsag_xmit_need IS must_be_sent;

(pocsag_priority_weight) IF pocsag_priority IS low THEN pocsag_xmit_need IS little;
(pocsag_priority_weight) IF pocsag_priority IS medium THEN pocsag_xmit_need IS some;
(pocsag_priority_weight) IF pocsag_priority IS next_opportunity THEN pocsag_xmit_need IS high;
(pocsag_priority_weight) IF pocsag_priority IS preemptive THEN pocsag_xmit_need IS must_be_sent;

METHOD AND APPARATUS FOR SELECTING A BATCH OF PENDING MESSAGES FOR A NEXT TRANSMISSION

FIELD OF THE INVENTION

This invention relates in general to contiguous logic and more specifically to use of contiguous logic in selecting a particular selective call protocol for transmission of information.

BACKGROUND OF THE INVENTION

Optimizing the selection of a selective call protocol among a plurality of available selective call protocols for transmission of information presents a complex task that would probably become a computation nightmare to accurately model. Selective call systems such as those found in one and two way radio frequency (RF) paging networks, are typically of the store and forward type. This is an advantage allowing for the delay and reordering of information to efficiently pack the information before transmission. The processes involved are commonly referred to as batching and queuing. If there were no other requirements than efficiency of air time utilization and a single protocol, the process would be rather simple. In real systems however, other factors influence and complicate the process. Real systems will eventually require the ability to use multiple protocols and account for the numerous factors that make transmissions using one protocol more advantageous over another protocol. Thus, a need exists for an adaptive system and method for choosing a selective call protocol among a plurality of available selective call protocols.

SUMMARY OF THE INVENTION

An aspect of the present invention is an apparatus for selecting, for a next transmission, a batch of pending messages among a plurality of batches of pending messages, wherein each of the plurality of batches has a corresponding selective call protocol for use in transmitting the batch, the apparatus comprising:

- a first memory arranged to store, for each of the plurality of batches, historical data, comprising an airtime efficiency rating of the selective call protocol corresponding to the batch, a latency measurement of the batch, and a message queue profile of the batch;
- a second memory arranged to store for each of the plurality of batches of pending messages, current information comprising at least an associated priority of the batch, synchronization requirement of the corresponding protocol, and allowable transmission time for sending the batch; and
- a sorter coupled to the first and second memories and arranged to classify the historical data and the current information so as to select an optimum batch among the plurality of batches for the next transmission.

Another aspect of the present invention is a radio frequency manager for selecting, for a next transmission, a batch of pending messages among a plurality of batches of pending messages, wherein each of the plurality of batches has a corresponding selective call protocol for use in transmitting the batch, the radio frequency manager comprising:

- a first memory arranged to store, for each of the plurality of batches, historical data comprising an airtime efficiency rating of the selective call protocol corresponding to the batch, a latency measurement of the batch, and a message queue profile of the batch;
- a second memory arranged to store for each of the plurality of batches of pending messages, current information comprising at least an associated priority of the batch, synchronization requirement of the corresponding protocol, and allowable transmission time for sending the batch;
- a sorter coupled to the first and second memories and arranged to classify the historical data and the current information using fuzzy logic so as to select an optimum batch for the next transmission, and, alternatively, to select a second optimum batch for the next transmission of the selective call messages if the optimum batch is not available, wherein the sorter comprises a fuzzifier for generating membership values for historical and current input conditions, a rule base for applying a set of predetermined rules to the current input conditions to perform a mapping with the historical conditions, and a defuzzifier for generating a non-fuzzy prediction recommendation from the mapping, and for generating the optimum batch and, alternatively, for generating the second optimum batch;
- a plurality of processing elements including an input processing element for receiving bias settings for airtime efficiency, latency, priority, and battery savings;
- an output processing element for outputting the optimum batch identified; and
- an intermediate processing element for coupling the input processing element with the output processing element.

Another aspect of the present invention is a method for selecting, for a next transmission, a batch of pending messages among a plurality of batches of pending messages, wherein each of the plurality of batches has a corresponding selective call protocol for use in transmitting the batch, comprising the steps of:

a) identifying a plurality of inputs for use in selecting the batch;
b) defining contiguous logic sets for each of the plurality of inputs identified;
c) defining a contiguous logic set for a desired output;
d) defining rules relating contiguous logic sets for each input with the contiguous logic set for the desired output;
e) maintaining statistics based on information received from the plurality of inputs;
f) executing the rules when a selection of one of the plurality of batches is required based on the statistics maintained; and
g) selecting the batch with a highest need as determined by the rules.

BRIEF DESCRIPTION OF THE DRAWINGS

3

FIG. 9 is a linguistic rule-base in accordance with the present invention.

DESCRIPTION OF THE PREFERRED EMBODIMENT

Most contiguous logic systems use a rule-base as their central structure. Rules, typically cast in an if-then syntax, represent system operation, mapping inputs to outputs. Measured crisp input values are "fuzzified", using membership functions, into fuzzy truth values or degrees of membership. These are then applied as conditions to the rules contained in the rule-base, with triggered rules specifying necessary actions, again as fuzzy truth values. These actions are combined and "defuzzified" into crisp, executable system outputs. Where inputs and outputs are continues (as in control applications), this fuzzify-infer-defuzzify process is performed on an ongoing basis, at regular sampling intervals. In summary, crisp inputs are measured and assigned fuzzy membership values as part of the fuzzification step, which are applied as conditions to the rules in the rule-base. The rules then specify what actions are to be taken, although in fuzzy terms. Fuzzy actions from typically two or more rules are combined and transformed back into executable system outputs.

Conceptually this process is similar to the use of a Fast Fourier Transform and its inverse to transform time domain signals into the frequency domain, to process the resulting frequencies, and then to transform the results back into the time domain. The added expense of transforming between time and frequency domains is justified because the system model is easier to understand and manipulate in terms of frequencies.

Similarly, a contiguous logic system "transforms" signals from the "crisp domain" to the "fuzzy domain", makes decisions based on these fuzzy values and knowledge of the desired system operation cast in fuzzy terms (rules), and then transforms the results back into the crisp domain for execution. The justification is, as with frequency domain processing, that the system model is easier to understand and manipulate in the fuzzy domain than in the crisp domain.

Figure 1:
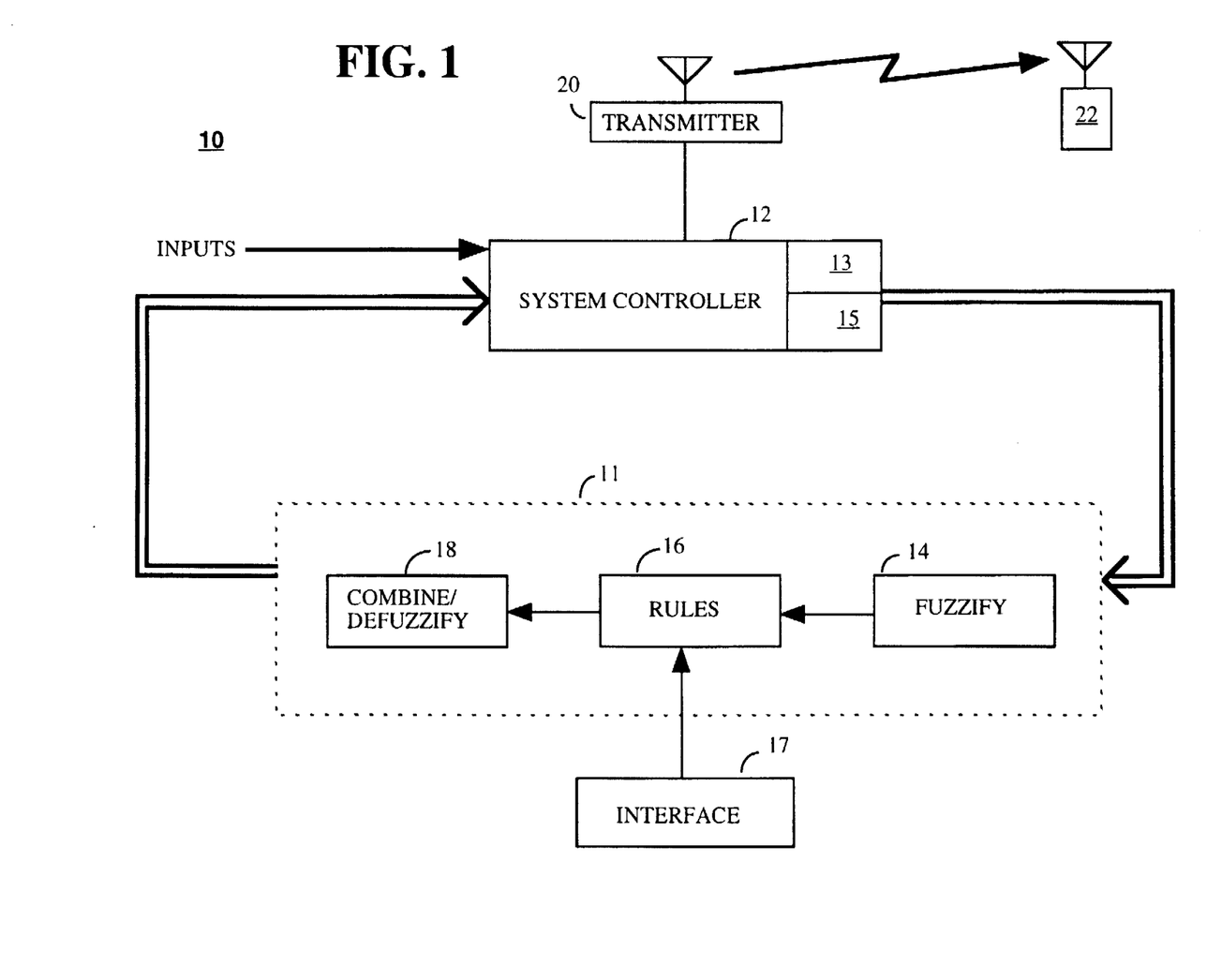
FIG. 1 is an adaptive system for choosing a selective call protocol in accordance with the present invention.

This basic fuzzy rule-based structure can be used in choosing a selective call protocol among a plurality of protocols. By allowing for flexibility in the definition of fuzzy logic operators, and especially in how action combination/defuzzification is performed, the breadth of application is even further increased. Referring to FIG. 1, an adaptive system 10 for choosing a selective call protocol is shown in accordance with the present invention. The system 10 includes a system controller 12 or radio frequency manager that uses a contiguous logic controller 11 or sorter to determine which protocol to use. The contiguous logic controller 11 or sorter preferably comprises a fuzzifier 14, a rule-based element 16 or inference engine and a defuzzifier 18. The sorter 11 preferably classifies historical data and current information so as to select an optimum protocol among a plurality of protocols available for the next transmission of the selective call messages and alternatively select a second optimum protocol for the next transmission if the optimum protocol is not available. Preferably, the fuzzifier 14 generates membership values for historical and current input conditions while the rule-based element 16 applies a set of predetermined rules of the current input conditions to perform a mapping with the historical conditions. The defuzzifier 18 preferably generates a non-fuzzy predicted recommendation from the mapping, and for generating the optimum protocol or alternatively for generating a second optimum protocol. The contiguous logic controller or sorter 11 simplifies the decision making process for the system controller 12 in determining whether to choose one protocol or another for transmission of a message through a transmitter 20. The sorter 11 uses the fuzzifier 14 as an input processing element for receiving biases for airtime efficiency, latency, priority, battery savings among other biases. The sorter 11 uses the defuzzifier 18 as an output processing element for outputing the optimum protocol and finally, the rule-based element 16 is used as an intermediate processing element for coupling the input processing element with the output processing element. Additionally, the system 10 includes an operator to modify the rule-based element 16 and further preferably provides for built-in limits to prevent such modifications from exceeding safeguarded situations. The modifications can be achieved using a graphical input such as the interface 17 shown in FIG. 1. In the examples shown, the assumption is made that the system controller 12 only needs to choose between two protocols for simplicity. The paging protocols used in the examples shown are FLEX® and POCSAG, but other protocols in any combination could potentially be used such as pACT, APOC, ERMES, or GOLAY.

The radio frequency manager or system controller 12 preferably comprises a first memory 13 for storing historical data on messages previously sent, the historical data comprising for each protocol an airtime efficiency rating, a latency measurement, and a message queue profile. Of course, other historical data can be tracked as suitably required. The radio frequency manager or system controller 12 also preferably comprises a second memory 15 for storing a plurality of pending messages, each of the pending messages having current information comprising at least an associated priority, synchronization requirement, and allowable transmission time for the sending of the pending messages.

FIGS. 2-7 show plots of membership functions for different characteristics corresponding to a selected batch of pending messages or protocol therefor, the characteristics used in the fuzzifier 14 to determine a degree of membership for the selected protocol in defined sets of each of the characteristics, given a crisp input value. Measured crisp input values are "fuzzified", using membership functions, into fuzzy truth values or degrees of membership. For instance, a FLEX message having a measured efficiency of 65%, would have a degree of membership of 0.15 in the set "HIGH" while also having a degree of membership of 0.27 in the set "LOW" in accordance with the membership function shown in FIG. 2. These are then applied as conditions to the rules contained in the rule-base of FIG. 9, with triggered rules specifying necessary actions, again as fuzzy truth values. For instance, see rule stating "IF flex_latency IS high AND flex_efficiency IS high THEN flex_xmit_need IS high." This along with other actions are combined and "defuzzified" into crisp, executable system outputs.

More specifically, there are a number of paging protocols each having different characteristics which can influence their efficiency, and the efficiency of the selective call receivers they are signaling. These protocols often must coexist on the same network, with time allocated for each one's operation in a manner which optimizes its particular requirements. They have in common among other things the factors of airtime efficiency, latency, priority, and subscriber unit battery savings. Each of these factors is further described below.

Figure 2:
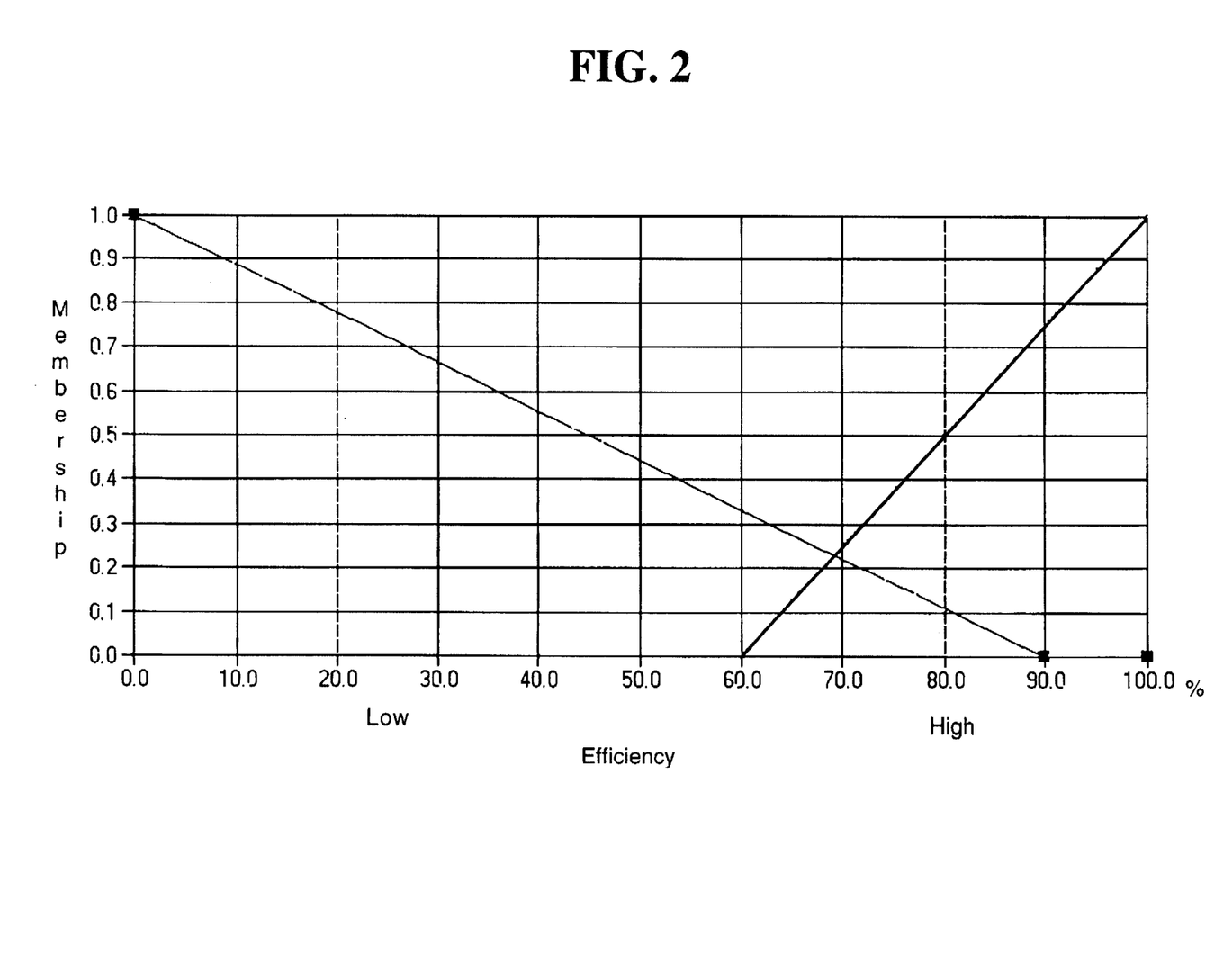
FIG. 2 is a plot of a membership function for an Efficiency characteristic of a selected protocol in accordance with the present invention.

Airtime Efficiency is a key factor for service providers since servicing as large a volume of paging traffic as possible would maximize their profits. If service providers charge flat rates per subscriber, this means they must support as many pages per unit of RF bandwidth as possible. If they charge by the packet of data sent, the raw number of packets becomes significant. FIG. 2 is a plot of a membership function reflecting an Efficiency characteristic of a selected protocol in accordance with the present invention.

Figure 3:
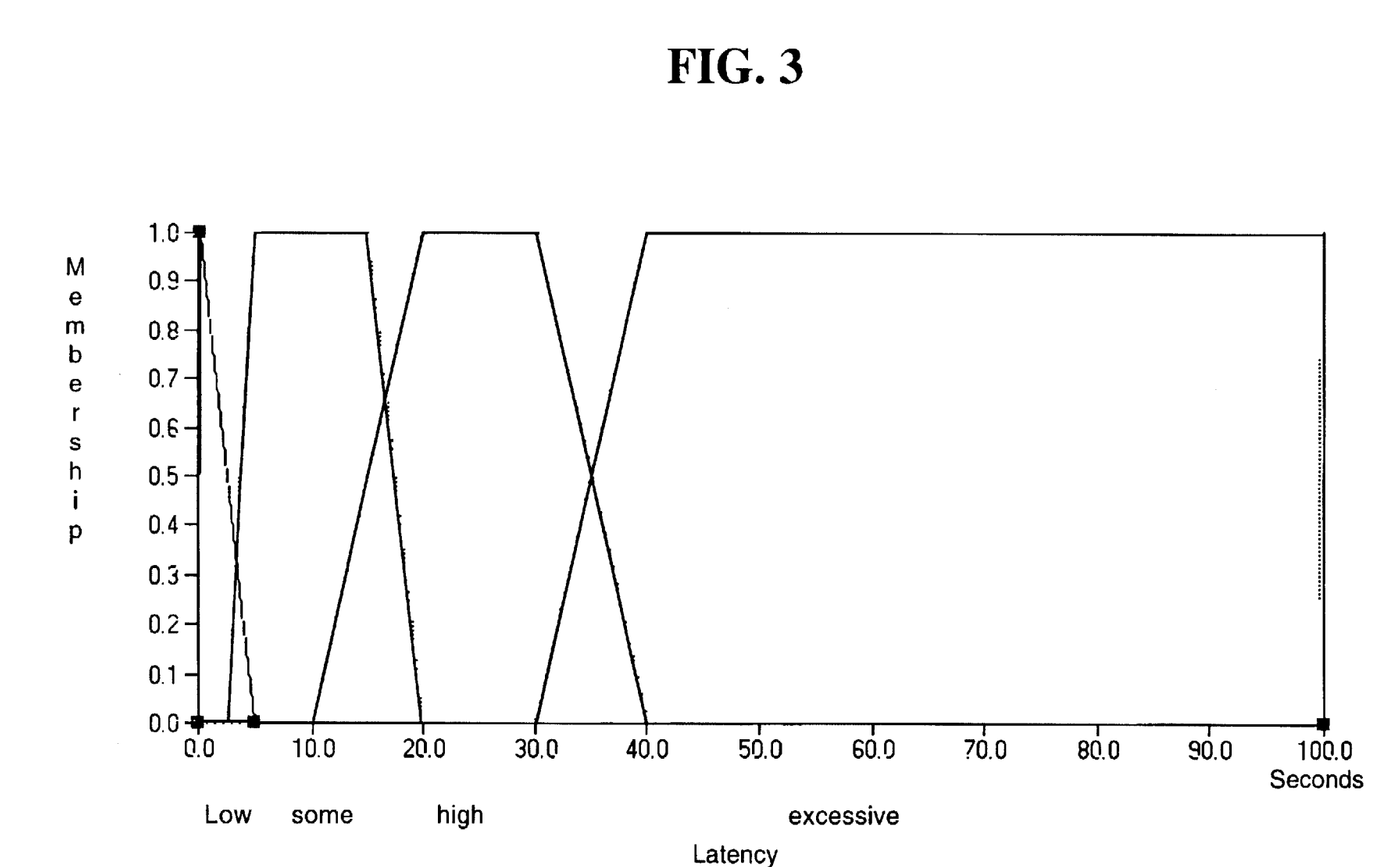
FIG. 3 is a plot of a membership function for a Latency characteristic of a selected batch of pending messages in accordance with the present invention.
Figure 4:
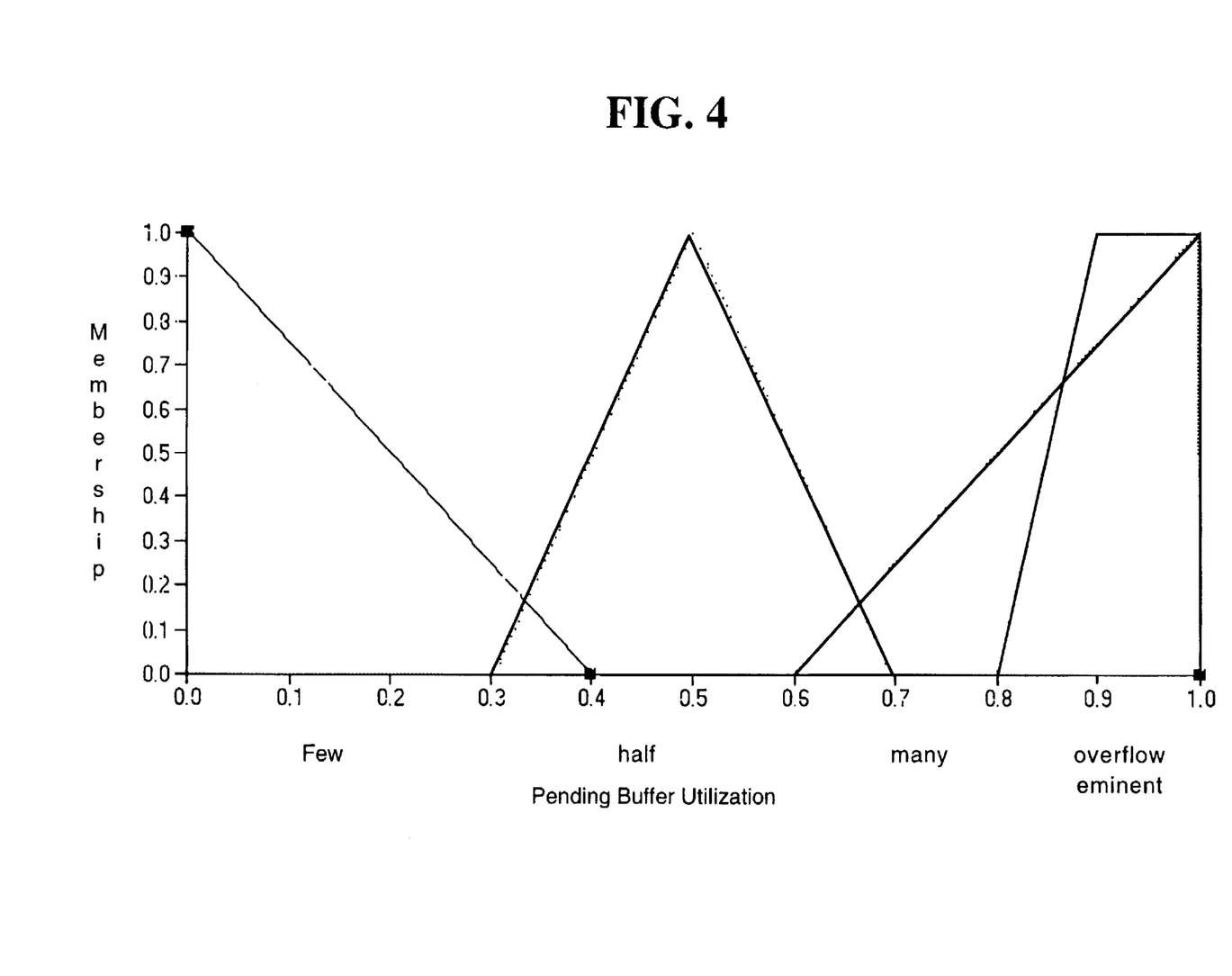
FIG. 4 is a plot of a membership function for a Pending Buffer Utilization characteristic of a selected batch of pending messages in accordance with the present invention.
Figure 5:
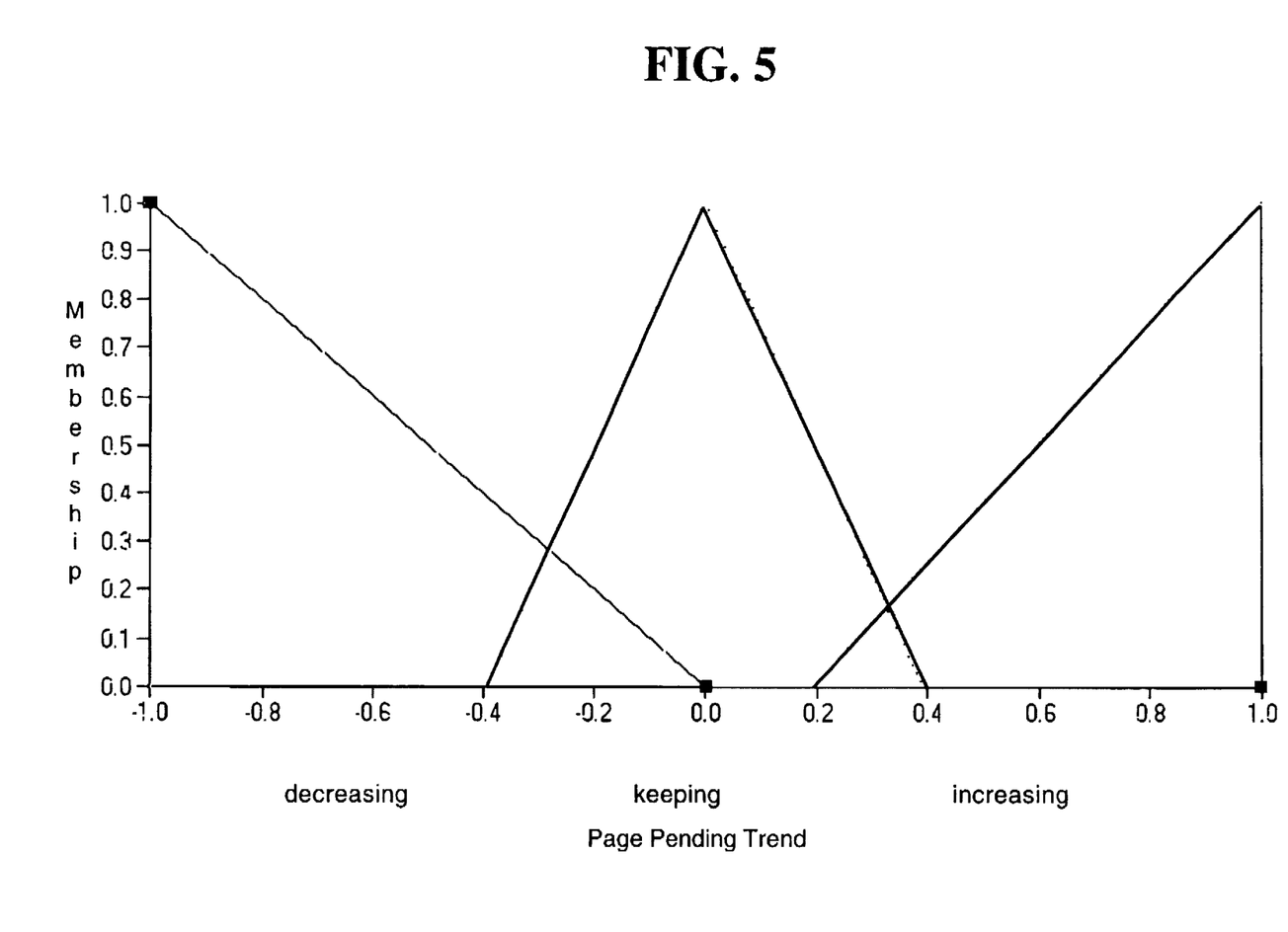
FIG. 5 is a plot of a membership function for a Page Pending Trend characteristic of a selected batch of pending messages in accordance with the present invention.

With respect to latency, pages or messages can become old and stale. Those sent with the idea of immediately conveying information, can be of decreasing value as they are delayed in the system. In some cases this can cause additional traffic in a system as people reinitiate a page, believing a page has been missed or ignored, when in fact it may not as of yet left the system. In extreme cases (examples: medical & fire) their delay can actually be life threatening. FIG. 3 is a plot of a membership function reflecting a Latency characteristic of a selected batch of pending messages in accordance with the present invention.

Figure 6:
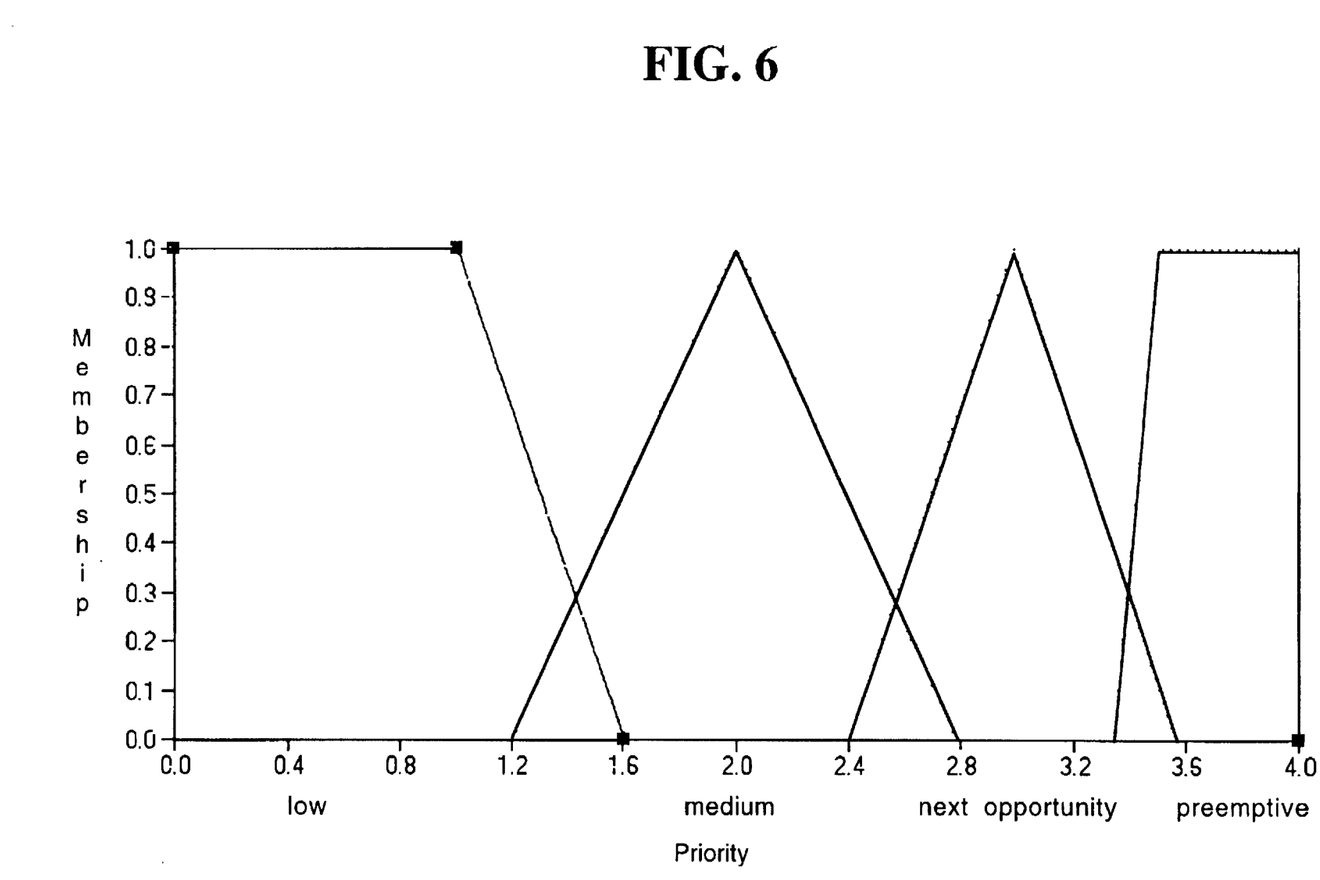
FIG. 6 is a plot of a membership function for a Priority characteristic of a selected batch of pending messages in accordance with the present invention.

With respect to priority, the relative importance of a page can be entered into a system as a priority level. FIG. 6 is a plot of a membership function reflecting a Priority characteristic of a selected batch of pending messages in accordance with the present invention. Messages with higher priorities should in general be sent prior to lower ones. This may not always happen however, even in efficient systems. If a particular priority page defines the other pages to be sent, a lower priority may be blocked, while still lower priority pages which are not blocked are sent. Preemptive priority (same examples as extreme latency cases) are a special case causing most other paging rules to become invalid until the page is sent.

Figure 7:
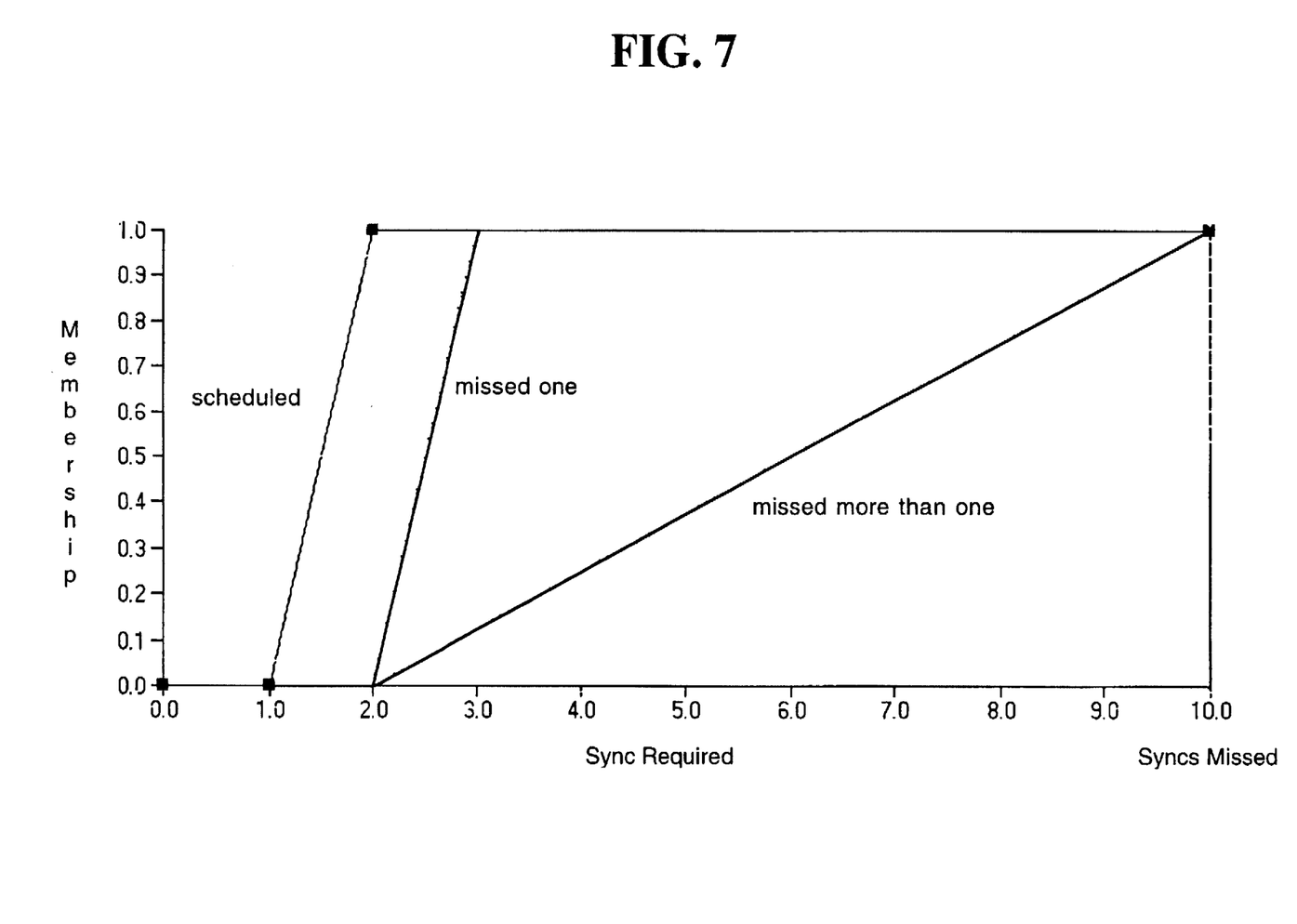
FIG. 7 is a plot of a membership function for FLEX Sync Required in accordance with the present invention.

Battery savings at a subscriber unit 22 (shown in FIG. 1) is a key advantage of pagers over other communication devices due to their long useful battery life. This is mostly achieved by making use of the store and forward nature of paging systems, to allow pagers to 'sleep' until specific prearranged time periods. Different paging protocols handle this feature in different ways. The FLEX™ paging protocol for example sends pagers synchronization transmissions at a minimum rate even when messages are not being transmitted. If the pagers do not detect this sync signal when they awaken, they must search for it. Searching in turn requires the pager to remain awake longer then normal, which consumes more battery power. Thus, synchronization is critical in the FLEX™ paging protocol for retaining certain battery saving advantages. FIG. 7 is a plot of a membership function for FLEX Sync Required in accordance with the present invention.

Another factor is the relative state of the system. During low RF utilization periods, efficiency may not be an important factor. When the system becomes heavily loaded however, latency may become a more important issue.

These variables are often optimized by different approaches to batching and queuing. A strategy which is good for one can be detrimental to one or more of the others. As a paging system matures, the mix of pager types with respect to protocols in use, as well as pager types (numeric, alphanumeric, voice, tone only, etc.) may vary.

Considering all the above tradeoffs in an all inclusive, adaptive manner is a nontrivial task. The exact definitions and relative importance of factors can vary amongst customers. In fact a service provider can find it difficult to define their own biases given the need to satisfy all customer requirements, regardless of their conflicting implications.

Over time the situations considered optimum also change. This can be because of better understanding of the system's operation and/or customer's needs. Present paging batching and queuing management systems are optimized towards one type of scenario. If the customer wants modifications, the product manufacturer must explicitly redefine its operation to the new goals.

The ideal system would take into account all the previous requirements in a form that is easy to understand and adjust, yet is robust and extensible. The present invention can closely approach the ideal system having sufficient inputs. The embodiment disclosed only considers choosing between two protocols: POCSAG and FLEX™. As seen, the invention is easily extensible to an arbitrary number of different protocols.

In a real example, statistics relating to the batching and queuing of each protocol can generate inputs for the decision making process. A potential set preferably includes efficiency, latency, pendency (FIG. 4), pendency trend (FIG. 5), priority and synchronization. Given the protocol's recent historic use of airtime, statistics on efficiency will show the fraction of time used for actual data transmission. Statistics on latency will show the average length of time pages are remaining in the queues before being sent. Statistics on pendency will would show the number of pages actually remaining in the queues for a given protocol type. Statistics on a pendency trend is derived from the number of messages pending during a specified time interval. A figure of merit indicating the increase and reduction in the size of the queue is therefore derived. Statistics on priority would show the priority assigned to a page either at input, or incremented by the system because of excessive individual residence in a queue.

Finally, a mixed system using the FLEX™ protocol must account for the system's requirement for synchronization for the FLEX™ protocol.

In a conventional approach, accounting for these variables is very straight forward. If FLEX™ synchronization is required, the FLEX™ protocol is used. If either protocol has a higher priority item pending, the higher priority item is sent using the predetermined protocol. Otherwise, the protocol with the oldest or most pages pending is chosen.

Figure 8:
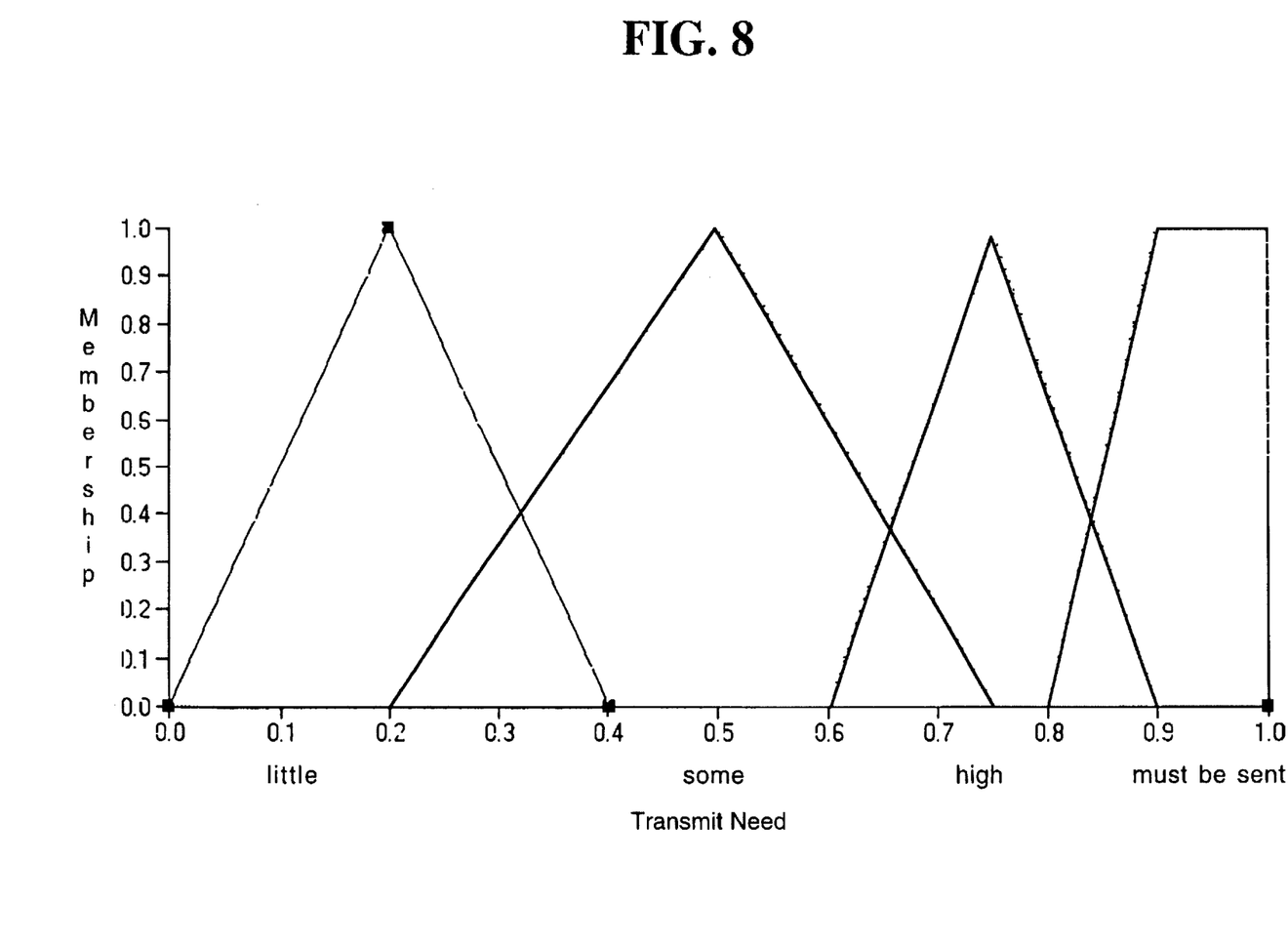
FIG. 8 is a plot of an output function for a Transmit Need characteristic of a selected batch of pending messages in accordance with the present invention.

Using the approach of the present invention would require defining contiguous logic sets for each of the inputs shown in FIGS. 2–7. Next, a contiguous logic set for a "need" to transmit a particular protocol is defined which serves as an output set as shown in FIG. 8. Rules are then defined relating the inputs to the output set or sets. Preferably, the rules are easily defined linguistically as shown in FIG. 9. The rules are then executed based on the statistics as they exist at each protocol choosing. Whichever protocol has the higher "need" determines the choice of the protocol used to transmit a particular message. Alternatively, the rules can be defined in other forms other than linguistically. For instance, the rules could be defined as a matrix of sets or the rules could utilize a neural net (see *Neural Networks and Fuzzy Systems*, by Bart Kosko 1992) to refine the rules as the system operates in a real setting. Contiguous logic systems use neural systems to learn fuzzy rules from examples or to tune the rules. The net learns the fuzzy rules by adapting its dynamic structure. The rules emerge as the equilibrium states of the neural dynamic system. One ordinarily skilled in the art will appreciate that the embodiments described and the linguistic rules disclosed are merely exemplary and that variations and modifications can be made within the scope and spirit of the present invention as defined by the appended claims.

Figure 10:
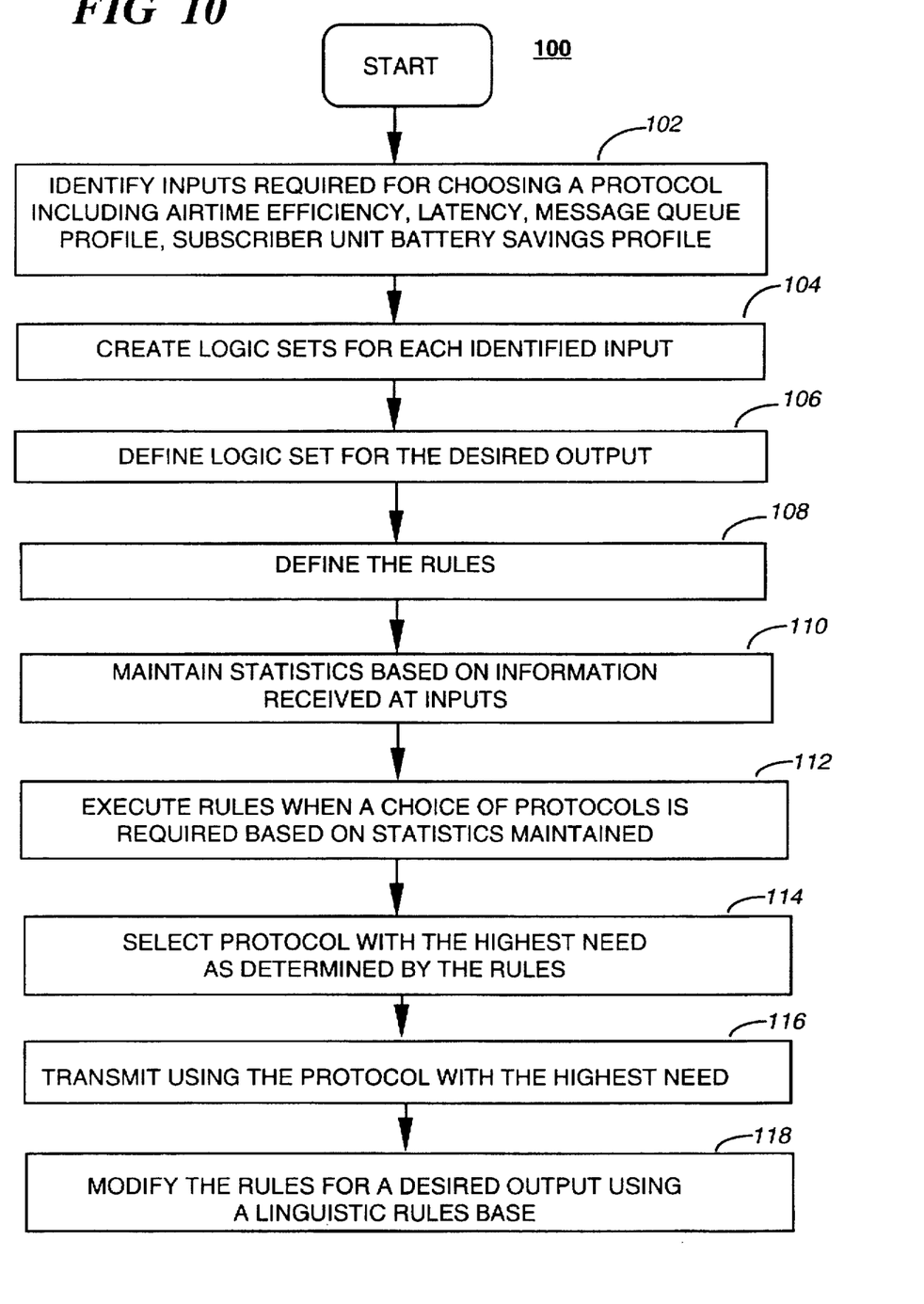
FIG. 10 is a flow chart of a method of choosing a selective call protocol in accordance with the present invention.

FIG. 10 illustrates a flow chart of a method 100 of choosing a selective call protocol among a plurality of selective call protocols in accordance with the present invention. At step 102, a plurality of inputs are identified for use in a choosing a selective call protocol including inputs for airtime efficiency, latency, message queue profile, and subscriber unit battery savings profile. At step 104, contiguous logic sets are defined or created for each of the inputs identified. At step 106, a contiguous logic set for the desired output is created. Then, at step 108, rules are defined relating the contiguous logic sets for each input with the contiguous logic set for the desired output. At step 110, statistics are maintained based on information received from the inputs. The rules are executed at step 112 when a choice of one of the plurality of selective call protocols is required based on the statistics maintained. Finally, at step 114 the selective call protocol is selected with the highest need as determined by the rules. As a consequence, at step 116, information is transmitted using the selective call protocol selected to have the highest need. Optionally, the method 100 could further comprise the step 118 of modifying the relationships between the contiguous logic sets for each input and the contiguous logic set for the desired output by defining an inference engine using a linguistic rule base.

The advantages of this approach are many. Using contiguous logic allows all concerns regarding selection of the protocol to be addressed. New rules can be added rapidly, since the decision factors are mostly of a parallel calculating nature. Transitions from one scenario to another is gradual rather than abrupt. Further, this prevents one protocol from completely dominating another excessively, when a partial bias will balance the system in a reasonable manner.

If desired, additional protocols can be added to the consideration by defining similar rules, which linguistically change the existing ones. Finally, the system manager can be given control over the weights of the rules. This allows flexibility in biasing the system's operation, while minimizing the possibility of totally disrupting the system.

In summary the present invention preferably uses contiguous logic to define the decision making variables, wherein there can be consideration of all the variables affecting the decision process at all times. A customer such as a service provider can access, define, or refine weights which allow biasing of the decision making process, without leading to undesirable operating characteristics. Finally use of linguistic rules can be used to determine the near optimum decision.

I claim:

1. An apparatus for selecting, for a next transmission, a batch of pending messages among a plurality of batches of pending messages, wherein each of the plurality of batches has a corresponding selective call protocol for use in transmitting the batch, the apparatus comprising:

a first memory arranged to store, for each of the plurality of batches historical data, comprising an airtime efficiency rating of the selective call protocol corresponding to the batch, a latency measurement of the batch, and a message queue profile of the batch;

a second memory arranged to store for each of the plurality of batches of pending messages, current information comprising at least an associated priority of the batch, synchronization requirement of the corresponding protocol, and allowable transmission time for sending the batch; and a sorter coupled to the first and second memories and arranged to classify the historical data and the current information so as to select an optimum batch among the plurality of batches for the next transmission.

2. The apparatus as set forth in claim 1, wherein the sorter is arranged to alternatively select a second optimum batch for the next transmission if the optimum batch is not available.

3. The apparatus as set forth in claim 1, wherein the apparatus further comprises a plurality of processing elements including an input processing element for receiving bias settings for airtime efficiency, latency, priority, and battery savings; an output processing element for outputting the optimum protocol identified; and an intermediate processing element for coupling the input processing element with the output processing element.

4. The apparatus as set forth in claim 1, wherein the sorter a arranged to classify the historical data and the current information using fuzzy logic.

5. The apparatus as set forth in claim 4 wherein the sorter comprises:

a fuzzifier for generating membership values for historical conditions and current input conditions; and a rule base for applying a set of predetermined rules to the current input conditions to perform a mapping with the historical conditions.

6. The apparatus a set forth in claim 5 wherein the sorter further comprises:

a defuzzifier for generating a non-fuzzy prediction recommendation from the mapping, and for selecting the optimum batch and alternatively, for selecting a second optimum batch.

7. The apparatus as set forth in claim 5, wherein the sorter further comprises an operator to modify the rule base for a fuzzy logic rules engine and a limiter to prevent such modifications from causing safeguarded situations to be exceeded.

8. The apparatus as set forth in claim 7, wherein a linguistic input is used to modify relationships defining a inference engine operation associated with the rule base for the fuzzy logic rules engine.

9. The apparatus as set forth in claim 7, wherein a graphical input is used to modify relationships defining a inference engine operation associated with the rule base for the fuzzy logic rules engine.

10. A radio frequency manager for selecting, for a next transmission, a batch of pending messages among a plurality of batches of pending messages, wherein each of the plurality of batches has a corresponding selective call protocol for use in transmitting the batch, the radio frequency manager comprising:

a first memory arranged to store, for each of the plurality of batches, historical data comprising an airtime efficiency rating of the selective call protocol corresponding to the batch, a latency measurement of the batch, and a message queue profile of the batch;

a second memory arranged to store for each of the plurality of batches of pending messages, current information comprising at least an associated priority of the batch, synchronization requirement of the corresponding protocol, and allowable transmission time for sending the batch;

a sorter coupled to the first and second memories and arranged to classify the historical data and the current information using fuzzy logic so as to select an optimum batch for the next transmission, and, alternatively, to select a second optimum batch for the next transmission of the selective call messages if the optimum batch is not available, wherein the sorter comprises a fuzzifier for generating membership values for historical and current input conditions, a rule base for applying a set of predetermined rules to the current input conditions to perform a mapping with the historical conditions, and a defuzzifier for generating a non-fuzzy prediction recommendation from the mapping, and for generating the optimum batch and, alternatively, for generating the second optimum batch;

a plurality of processing elements including an input processing element for receiving bias settings for airtime efficiency, latency, priority, and battery savings;

an output processing element for outputting the optimum batch identified; and an intermediate processing element for coupling the input processing element with the output processing element.

11. The radio frequency manager as set forth in claim 10, wherein the sorter further comprises an operator to modify the rule base for a fuzzy logic rules engine and a limiter to prevent such modifications from causing safeguarded situations to be exceeded.

12. The radio frequency manager as set forth in claim 11, wherein a linguistic input is used to modify relationships defining a inference engine operation associated with the rule base for the fuzzy logic rules engine.

13. The radio frequency manager as set forth in claim 12, wherein a graphical input is used to modify relationships defining a inference engine operation associated with the rule base for the fuzzy logic rules engine.

14. A method for selecting, for a next transmission, a batch of pending messages among a plurality of batches of pending messages, wherein each of the plurality of batches has a corresponding selective call protocol for use in transmitting the batch, comprising the steps of:

a) identifying a plurality of inputs for use in selecting the batch;

b) defining contiguous logic sets for each of the plurality of inputs identified;

c) defining a contiguous logic set for a desired output;

d) defining rules relating contiguous logic sets for each input with the contiguous logic set for the desired output;

e) maintaining statistics based on information received from the plurality of inputs;

f) executing the rules when a selection of one of the plurality of batches is required based on the statistics maintained; and g) selecting the batch with a highest need as determined by the rules.

15. The method of claim 14, further comprising the step of h) transmitting the batch selected to have the highest need.

16. The method of claim 14, wherein the step of identifying a plurality of inputs includes the step of identifying an airtime efficiency rating of the selective call protocol corresponding to the batch, a latency measurement of the batch, and a message queue profile of the batch.

17. The method of claim 16, wherein the step of identifying a plurality of inputs further includes the step of indentifying a subscriber unit battery savings measurements.

18. The method of claim 14, wherein the step of defining rules comprises the step of modifying relationships between the contiguous logic sets for each input and the contiguous logic set for the desired output by defining an inference engine using a linguistic rule base.

* * * * *

UNITED STATES PATENT AND TRADEMARK OFFICE
CERTIFICATE OF CORRECTION

PATENT NO.    : 5,767,785
DATED         : June 16, 1998
INVENTOR(S)   : Steven J. Goldberg It is certified that error appears in the above-identified patent and that said Letters Patent is hereby corrected as shown below:

<u>Column 8,</u>
Line 24: after the word "sorter", replace "a" with "is".
Line 33: after the word "apparatus", replace "a" with "as".

Signed and Sealed this

Twenty-eighth Day of August, 2001

*Attest:*

NICHOLAS P. GODICI
*Attesting Officer*   *Acting Director of the United States Patent and Trademark Office*